United States Patent Office 3,190,875
Patented June 22, 1965

3,190,875
ETHYLENICALLY UNSATURATED ETHERS
OF AZOBENZENE
Martin M. Skoultchi, New York, N.Y., Albert I. Goldberg, Berkeley Heights, N.J., and Joseph Fertig, New York, N.Y., assignors to National Starch and Chemical Corporation, New York, N.Y., a corporation of Delaware
No Drawing. Filed Apr. 19, 1962, Ser. No. 188,862
6 Claims. (Cl. 260—196)

This invention relates to the preparation of novel ethylenically unsaturated derivatives of azobenzene and more particularly to ethylenically unsaturated ethers of azobenzene.

It is the object of this invention to produce a novel class of ethylenically unsaturated azobenzene derivatives which are capable of undergoing vinyl type polymerization reactions either alone or in the presence of other vinyl type comonomers. A further object of this invention involves the preparation of polymerizable azobenzene derivatives which can be incorporated into a wide variety of polymers and copolymers so as to provide such polymers with a permanent integral color as well as with improved light stability.

As is well known in the art, a vast number of the derivatives of azobenzene, i.e., derivatives of

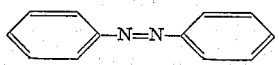

are employed as dyes and coloring agents. These compounds, which are collectively referred to as azo dyes, have had extensive application, particularly in the textile industry, wherein they have long been successfully used for the dyeing of naturally derived fibers and fabrics, such as those made from wool, cotton, silk and linen, as well as of artificial cellulosic fibers and fabrics, such as those made from rayon and various cellulose esters. However, with the advent and ever increasing popularity of the purely synthetic fibers, such as those derived, for example, from polyacrylic, polyester, polyvinyl chloride, polyvinylidene chloride, and polyolefin resins, it was found that many azo dyes, as well as many other existing dyes and dyeing techniques, were no longer operable with these new synthetic resin based fibers. As a result, it became necessary to devise new dyes and dyeing techniques for these materials. Moreover, dyes, in general, cannot be used for the permanent coloring of the films, sheets, and molded products which are made from such synthetic resins since such conversion products can be colored only by the inclusion, therein, of extraneous pigments.

The novel compositions of our invention are the ethylenically unsaturated azobenzene derivatives corresponding to the formula:

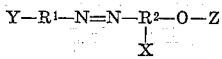

wherein $R^1$ and $R^2$ are radicals of the benzene series selected from among the group consisting of phenyl and naphthyl radicals and wherein Z is an ethylenically unsaturated group selected from among the class consisting of beta-hydroxypropyl acrylate and beta-hydroxypropyl methacrylate groups and X and Y represent at least one member selected from among the group consisting of hydrogen, alkyl, aryl, acyloxy, aralkyl, alkoxy or halogen radicals.

The following list is representative of the azobenzene derivatives of our invention. For purposes of brevity, this list notes only the beta-hydroxypropyl acrylate derivatives; however, it is, of course, to be understood that the corresponding beta-hydroxypropyl methacrylate derivatives may also be prepared. One may thus list:

2-hydroxy-3-(4-[4-methylphenylazo]phenoxy)propyl acrylate;
2-hydroxy-3-(4-phenylazophenoxy)-propyl acrylate;
2-hydroxy-3-(4-[2-chlorophenylazo]phenoxy)propyl acrylate;
2-hydroxy-3-(4-[2-methoxyphenylazo]phenoxy)propyl acrylate;
2-hydroxy-3-(1-phenylazo-2-naphthyloxy)propyl acrylate;
2-hydroxy-3-(4-phenylazo-1-napthyloxy)propyl acrylate;
2-hydroxy-3-(4-[4-carboxymethylphenylazo]phenoxy) propyl acrylate;
2-hydroxy-3-(4-[3-methylphenylazo]phenoxy)-propyl acrylate;
2-hydroxy-3-(4-[2-methylphenylazo]phenoxy)propyl acrylate;
2-hydroxy-3-(4-[3-chlorophenylazo]phenoxy)propyl acrylate;
2-hydroxy-3-(4-[4-chlorophenylazo]phenoxy)propyl acrylate;
2-hydroxy-3-(4-[3-methoxyphenylazo]phenoxy)propyl acrylate;
2-hydroxy-3-(4-[4-methoxyphenylazo]phenoxy)propyl acrylate; and,
2-hydroxy-3-(2-phenyl-4-phenylazophenoxy)propyl acrylate.

Thus, the novel azobenzene derivatives of our invention as listed above, are seen to correspond to the following formula:

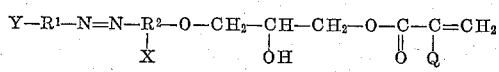

wherein $R^1$ is a phenyl radical, wherein $R^2$ is a radical of the benzene series selected from the group consisting of phenyl and naphthyl radicals, wherein Q is a radical selected from the group consisting of hydrogen and methyl radicals, wherein X and Y represent hydrogen, said oxygen and azo bridges in $R^2$ being separated by $n$ carbon atoms, wherein $n$ is a positive integer which is a multiple of two not exceeding four.

Thus, it is to be seen that the derivatives of our invention may be referred to as the beta-hydroxypropyl acrylate and the beta-hydroxypropyl methacrylate ethers of azobenzene. Each of the above listed derivatives, along with any others which may be prepared by the practitioner, may, in turn, contain a variety of other substituent groups including alkyl, aryl, acyloxy, aralkyl, alkoxy and halogen groups wherein any one, or more, of these substituent groups may be substituted upon any available position in one or both of the phenyl rings in the azobenzene nucleus. Moreover, it is this ability to prepare our novel derivatives so that they may contain one or more of these various substituent groups on any position in the azobenzene nucleus, which permits our derivatives to possess any desired shading of primary color.

All of the above listed compounds, as well as any others which may correspond to the above described formula, are materials which are capable of readily undergoing vinyl type polymerization. They are thus useful for the preparation of homopolymers and, more particularly, for the preparation of copolymers with a wide variety of other vinyl type, i.e., ethylenically unsaturated, monomers. Such copolymers have a "built in" color and also possess superior light stability. Both of the latter properties being imported to these copolymers as a result of the presence therein of the azobenzene moiety which is permanently bound into and inherently part of the resulting copolymer molecule as a result of the incorporation therein of the ethylenically unsaturated azobenzene derivatives of our invention. The use, in this manner, of these derivatives is thus seen to overcome the inadequacies of azo and other heretofore utilized dyes with respect to their unsuccessful use in the dyeing of fibers and fabrics, as well as for the coloring of films, sheets, and moldings derived from any of the synthetic resins which are prepared, either in whole or in part, from one or more ethylenically unsaturated monomers.

In brief, the synthesis of our novel derivatives is accomplished by the catalyzed reaction of either glycidyl acrylate or glycidyl methacrylate with a hydroxy azobenzene or substituted hydroxy azobenzene intermediate. This reaction thus yields either the beta-hydroxypropyl methacrylate or the beta-hydroxypropyl acrylate ether of azobenzene or of the substituted azobenzene intermediate. Hereinafter it is to be understood that the use, for purposes of brevity, of the expression, "the hydroxy azobenzene intermediate" is meant to include any hydroxy azobenzene as well as any substituted hydroxy azobenzene intermediate applicable for use in the process of our invention.

In conducting the above described reaction, the glycidyl acrylate or methacrylate, in a concentration amounting to a slight stoichiometric excess in the order of about 10 to 20% over the subsequently added hydroxy azobenzene intermediate, is first ordinarily admixed with the selected catalyst. The latter may be selected from among any member of the group consisting of the alkali metal hydroxides, such as sodium hydroxide or potassium hydroxide; and, the basic salts of the alkali metals, such as sodium bicarbonate or sodium carbonate. These catalysts should be present in a concentration in the range of about 0.1 to 5.0%, as based upon the weight of the glycidyl acrylate or methacrylate.

To this mixture, comprising the catalyst and the glycidyl acrylate or methacrylate, there is then added, with continued agitation, and preferably on a portionwise basis, the selected hydroxy azobenzene intermediate. Such portionwise addition, which may be either continuous or intermittent, is preferred in the process of our invention since these hydroxy azobenzene intermediates are, for the most part, either low melting solids or highly viscous oils. Thus, if they were to be completely added at the initiation of the reaction, they would promptly absorb the bulb of the glycidyl acrylate or methacrylate, thereby resulting in a solid heterogeneous mass which is rather difficult to mix. However, by adding these intermediates on a portionwise basis, the reaction mixture is, instead, readily maintained in a fluid, mixable state.

In those cases wherein the ultimate ethylenically unsaturated azobenzene derivative is known to undergo spontaneous homopolymerization, there may also be added to the reaction mixture from about 0.001 to about 0.1%, as based upon the initial weight of the hydroxy azobenzene intermediate, of a polymerization inhibitor such as benzoquinone or hydroquinone or its monomethyl ether.

Following the complete addition of the hydroxy azobenzene intermediate to the mixture of the catalyst and the glycidyl acrylate or methacrylate, agitation is continued while the reaction mixture is maintained at a temperature in the range of about 50 to 100° C., and preferably at about 70 to 80° C., for periods of about 6 to 8 hours. Under these conditions, the reaction between the glycidyl acrylate or methacrylate and the hydroxy azobenzene intermediate will ordinarily proceed to about 85 to 95% of the calculated theoretical yield.

In general, it should be noted that the reaction can be conducted at any temperature which will be high enough so as to result in an adequate reaction rate but which will not be so high as to cause the spontaneous polymerization of the resulting ethylenically unsaturated azobenzene derivative. In addition the length of the reaction period which will be required for the attainment of high yields will depend, for the most part, upon the specific hydroxy azobenzene intermediate which is being utilized. Thus, it is a matter of simple experimentation on the part of the practitioner to determine the precise combination of time and temperature which will be best suited for the synthesis of any of the novel azobenzene derivatives coming within the scope of our invention.

Upon the completion of the reaction, the resulting product will ordinarily solidify upon being allowed to cool to room temperature. For most purposes, including any subsequent polymerization reactions, this crude beta-hydroxypropyl acrylate or methacrylate ether of azobenzene can then be used without any further purification being necessary. However, where desired, the relatively small amount of unreacted hydroxy azobenzene intermediate may be removed. Thus, such means as chromatographic separation techniques, as for example with the use of a silica gel column, have been found to yield a product which, by means of saponification equivalent, will indicate a purity of 100%, by weight. Other separation techniques, such as alkaline or organic solvent extraction procedures, may also be used where so desired by the practitioner.

It is also possible, where so desired, to prepare the novel derivatives of our invention by reaction in an organic solvent medium. Under these conditions, the hydroxy azobenzene intermediate, the catalyst and the glycidyl acrylate or methacrylate may all be dissolved in a nonreactive polar solvent such as acetone, methyl ethyl ketone, or butyl acetate. The resulting derivative would then be recovered by distilling off the solvent whereupon the crude product could, again, be purified by means of any of the above noted techniques.

The intermediates for the above described process, i.e. the various applicable hydroxy azobenzene compounds, are commercially available materials which are prepared by means of reactions well known to those skilled in the art. These reactions involve the coupling, in an alkaline solution, of phenyl, or substituted phenyldiazonium halides together with a selected phenol or substituted phenol. Thus by starting with such substituted phenols are substituted phenyldiazonium salts, it is of course possible to prepare the ultimate beta-hydroxy acrylate or methacrylate ether of azobenzene with a variety of alkyl, aryl, acyloxy, aralkyl, alkoxy, or halogen radical substituents wherein said substituent radicals may be on either one or both of the phenyl rings of the azobenzene nucleus. By varying the structure of the intermediate in this manner, it is possible, as noted earlier, to prepare our ethylenically unsaturated azobenzene derivatives so that they may inherently possess any shading of primary color which may be selected by the practitioner. This, in turn, permits the copolymers which can be prepared with the use of our derivatives as comonomers to be made in any desired permanent color without the need for blending with extraneous pigments. It is to be noted, at this point, that the initial preparation of the hydroxy azobenzene intermediates does not constitute a novel aspect of the process of our invention.

The following examples will further illustrate the embodiment of this invention. In these examples, all parts given are by weight unless otherwise noted.

*Example I*

This example illustrates the preparation of 2-hydroxy-3-(4-[4 - methylphenylazo]phenoxy)propyl methacrylate, i.e.

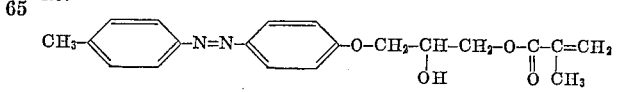

by means of the process of our invention.

To an agitated mixture of 156 parts of glycidyl methacrylate and 3.2 parts of a 50%, by weight, aqueous sodium hydroxide solution, there were added, on an intermittent, portionwise basis, 212 parts of 4-(methylphenylazo) phenol. During the addition of the latter hydroxy azobenzene intermediate, agitation was continued and the temperature of the reaction mixture was brought to a level in the range of 70–80° C. The addition of this hydroxy azobenzene intermediate took 30 minutes whereupon the reaction mixture was maintained, under agitation, for an additional 8 hour period at a temperature in the range of 70–80° C.

Upon being cooled to room temperature, i.e. 25° C., the resulting reaction product solidified. Analysis of the crude material, for the presence of any unreacted hydroxy azobenzene intermediate, indicated a yield of 350 parts of the 2-hydroxy-3-(4-[4-methylphenylazo] phenoxy)propyl methacrylate which was in the order of 90%, by weight, of the theoretical. This solid product, although tan in color, yielded orange-yellow solutions when dissolved in organic solvents such as acetone.

*Example II*

This example illustrates the preparation of 2-hydroxy-3-(4-[4-methylphenylazo] phenoxy)propyl acrylate, i.e.

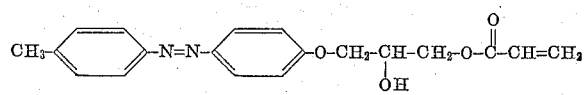

by means of the process of our invention.

In preparing this product, we employed the identical procedure as was utilized for the preparation of the derivative of Example I with the exception that 141 parts of glycidyl acrylate were, in this case, used in place of the 156 parts of glycidyl methacrylate of Example I. This procedure produced 332 parts, or about 89% of the theoretical yield, of solid 2-hydroxy-3-(4-[4-methylphenylazo] phenoxy)propyl acrylate. The solid product, although tan in color, yielded yellow solutions when dissolved in organic solvents such as acetone.

*Example III*

The following table presents the pertinent data relating to 14 additional ethylenically unsaturated azobenzene derivatives. In this table, derivatives Nos. 1, 3, 5, 7, 9, 11, and 13, i.e. the odd numbered derivatives, are beta-hydroxypropyl methacrylate ethers of azobenzene which were prepared by means of the procedure of Example I. Derivatives Nos. 2, 4, 6, 8, 10, 12, and 14, i.e. the even numbered derivatives, are beta-hydroxypropyl acrylate ethers of azobenzene which were prepared by means of the procedure of Example II. In the structural formulas which are given for each of these derivatives, the abbreviations "HPMA" and "HPA" are used, respectively, to designate beta-hydroxypropyl methacrylate and beta-hydroxypropyl acrylate groups.

| No. | Name | Structure | Parts azobenzene intermediate* | Yield (percent by wt.) | Yield (pts. by wt.) | Color of organic solvent solution |
|---|---|---|---|---|---|---|
| 1 | 2-hydroxy-3-(4-phenylazophenoxy)propyl methacrylate. | ⟨⟩—N=N—⟨⟩—O—HPMA | 198 | 91 | 338 | Yellow. |
| 2 | 2-hydroxy-3-(4-phenylazophenoxy)propyl acrylate. | ⟨⟩—N=N—⟨⟩—O—HPA | 198 | 92.5 | 330 | Do. |
| 3 | 2-hydroxy-3-(4-[2-chlorophenylazo]phenoxy)propyl methacrylate. | ⟨⟩(Cl)—N=N—⟨⟩—O—HPMA | 232.5 | 93 | 380 | Do. |
| 4 | 2-hydroxy-3-(4-[2-chlorophenylazo]phenoxy)propyl acrylate. | ⟨⟩(Cl)—N=N—⟨⟩—O—HPA | 232.5 | 92 | 362 | Do. |
| 5 | 2-hydroxy-3-(4-[2-methoxyphenylazo]phenoxy)propyl methacrylate. | ⟨⟩(OCH₃)—N=N—⟨⟩—O—HPMA | 228 | 90 | 365 | Orange. |
| 6 | 2-hydroxy-3-(4-[2-methoxyphenylazo]phenoxy)propyl acrylate. | ⟨⟩(OCH₃)—N=N—⟨⟩—O—HPA | 228 | 93 | 361 | Do. |
| 7 | 2-hydroxy-3-(1-phenylazo-2-naphthyloxy)propyl methacrylate. | ⟨⟩—N=N—naphthyl-O—HPMA | 248 | 94 | 400 | Red. |
| 8 | 2-hydroxy-3-(1-phenylazo-2-naphthyloxy)propyl acrylate. | ⟨⟩—N=N—naphthyl-O—HPA | 248 | 93.5 | 383 | Do. |
| 9 | 2-hydroxy-3-(4-phenylazo-1-naphthyloxy)propyl methacrylate. | ⟨⟩—N=N—naphthyl—O—HPMA | 248 | 93 | 396 | Do. |
| 10 | 2-hydroxy-3-(4-phenylazo-1-naphthyloxy)propyl acrylate. | ⟨⟩—N=N—naphthyl—O—HPA | 248 | 93 | 381 | Do. |

See footnote at end of table.

| No. | Name | Structure | Parts azobenzene intermediate* | Yield (percent by wt.) | Yield (pts. by wt.) | Color of organic solvent solution |
|---|---|---|---|---|---|---|
| 11 | 2-hydroxy-3-(4-[4-carboxymethylphenylazo]phenoxy)propyl methacrylate. | CH₃O-C(=O)-C₆H₄-N=N-C₆H₄-O-HPMA | 256 | 89 | 388 | Orange-red. |
| 12 | 2-hydroxy-3-(4-[4-carboxymethylphenylazo]phenoxy)propyl acrylate. | CH₃O-C(=O)-C₆H₄-N=N-C₆H₄-O-HPA | 256 | 86 | 361 | Do. |
| 13 | 2-hydroxy-3-(2-phenyl-4-phenylazophenoxy)propyl methacrylate. | C₆H₅-N=N-C₆H₃(C₆H₅)-O-HPMA | 216 | 89 | 336 | Yellow-orange. |
| 14 | 2-hydroxy-3-(2-phenyl-4-phenylazophenoxy)propyl acrylate. | C₆H₅-N=N-C₆H₃(C₆H₅)-O-HPA | 216 | 90 | 327 | Do. |

*The intermediates used for the preparation of the above described derivatives are listed below:

Derivatives Nos.: Intermediate
1. 4-phenylazophenol.
2. Do.
3. 4-(2-chlorophenylazo)phenol.
4. Do.
5. 4-(2-methoxyphenylazo)phenol.
6. Do.
7. 1-phenylazo-2-naphthol.
8. Do.
9. 4-phenylazo-1-naphthol.
10. Do.
11. 4-(4-carboxymethylphenylazo)phenol.
12. Do.
13. 2-phenyl-4-phenylazophenol.
14. Do.

Summarizing, our invention is thus seen to provide a novel class of ethylenically unsaturated derivatives of azobenzene. Variations may be made in proportions, procedures and materials without departing from the scope of this invention as defined in the following claims.

We claim:
1. An ethylenically unsaturated azobenzene derivative corresponding to the formula:

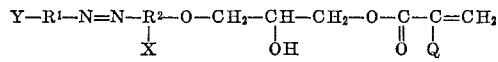

wherein $R^1$ is a phenyl radical, wherein $R^2$ is a radical of the benzene series selected from the group consisting of phenyl and naphthyl radicals, wherein Q is a radical selected from the group consisting of hydrogen and methyl radicals, wherein X is a substituent radical selected from the group consisting of hydrogen and phenyl radicals and Y is a substituent radical selected from the group consisting of hydrogen, methyl, chloro, methoxy, carboxymethyl and phenyl radicals; said oxygen and azo bridges in $R^2$ being separated by $n$ carbon atoms, wherein $n$ is a positive integer which is a multiple of two not exceeding four.

2. 2-hydroxy-3-(4-[4-methylphenylazo]phenoxy)propyl acrylate.

3. 2-hydroxy-3-(4-phenylazophenoxy)propyl acrylate.

4. 2-hydroxy-3-(4-[2-chlorophenylazo]phenoxy)propyl acrylate.

5. 2-hydroxy-3-(4-[2-methoxyphenylazo]phenoxy)propyl acrylate.

6. 2-hydroxy-3-(1-phenylazo-2-naphthyloxy)propyl acrylate.

No references cited.

CHARLES B. PARKER, *Primary Examiner.*